United States Patent [19]

Thate et al.

[11] 4,135,698

[45] Jan. 23, 1979

[54] SEALING DEVICE

[75] Inventors: Kurt Thate; Konrad Brückl, both of Munich, Fed. Rep. of Germany

[73] Assignee: AGFA-Gevaert AG, Leverkusen, Fed. Rep. of Germany

[21] Appl. No.: 768,539

[22] Filed: Feb. 14, 1977

[30] Foreign Application Priority Data

Feb. 20, 1976 [DE] Fed. Rep. of Germany ....... 2606813

[51] Int. Cl.² ............................................. F16K 7/10
[52] U.S. Cl. .................................. 251/61.1; 251/172; 250/315 A
[58] Field of Search ...................... 251/172, 159, 61.1, 251/193

[56] References Cited

U.S. PATENT DOCUMENTS

| 1,476,344 | 12/1923 | McGee et al. | 251/172 X |
| 2,370,751 | 3/1945 | Prager | 251/159 |
| 3,145,969 | 8/1964 | von Zweck | 251/172 |
| 3,371,493 | 3/1968 | Woolley | 251/172 X |

FOREIGN PATENT DOCUMENTS

| 868864 | 10/1941 | France | 251/172 |
| 1075635 | 4/1954 | France. | |

Primary Examiner—Arnold Rosenthal
Attorney, Agent, or Firm—Peter K. Kontler

[57] ABSTRACT

A sealing device which can open or seal a gap between two spaces that are maintained at different pressures has two members provided with surfaces flanking the gap and a seal which is received in a recess provided in one of the surfaces and extending transversely of the gap. The seal has a first section constituting a diaphragm or a hose which is secured to the recessed member and a second section resembling a flap integral with but pivotable relative to the first section at that side of the first section which is nearer to the low-pressure space. The first section is deformable in response to admission of pressurized fluid against one of its sides whereby the other side moves the flap, or at least the free marginal portion of the flap, against the surface of the non-recessed member. Once the flap is moved to the sealing position, that side thereof which faces away from the gap is or can be exposed to the action of pressurized fluid in the high-pressure space so that the flap continues to sealingly engage the non-recessed member even if the application of fluid pressure against the one side of the first section of the seal is terminated.

16 Claims, 7 Drawing Figures

SEALING DEVICE

BACKGROUND OF THE INVENTION

The present invention relates to sealing devices in general, and more particularly to improvements in sealing devices which can be used to interrupt communication between two chambers or spaces which are (or are likely to be) maintained at different pressures and are connected to each other by way of a gap. For example, the improved sealing device can be used in ionography imaging chambers wherein sheets of dielectric material must be introduced into and withdrawn from an interelectrode clearance wherein the pressure is normally in the range of 6–20 atmospheres superatmospheric pressure while the sheet is exposed to object-modulated X-rays.

In presently known sealing devices which are used for the aforementioned and similar purposes, the flow of a gaseous or other fluid between chambers or spaces containing fluids which are maintained at different pressures is prevented or interrupted by an inflatable hose or the like or by a deformable solid seal of elastomeric material. As a rule, the sealing element is inserted into a groove at one side of the gap and is deformed, either by admission of pressurized fluid into its interior or because it undergoes deformation during insertion. In the latter instance, the sealing action is more or less permanent which eliminates such seals from use in gaps which must be sealed only from time to time. Inflatable hoses exhibit the drawback that the extent of sealing engagement between their outer sides and the surface at the other side of the gap varies in response to changes in pressure of admitted fluid and also that they are unlikely to collapse and be retracted from the gap except when the pressure therein is reduced below the pressure acting against their external surfaces. Moreover, such inflatable hoses will seal only as long as the pressure therein exceeds the pressure in the gap.

SUMMARY OF THE INVENTION

An object of the invention is to provide a sealing device which can repeatedly prevent and permit the flow of a fluid and/or passage of objects or light through a gap between two spaces which are maintained, at least at certain times, under different pressure.

Another object of the invention is to provide a sealing device which can be used to prevent escape of gases from the interelectrode clearance of an ionography imaging chamber.

A further object of the invention is to provide a sealing device which is constructed and assembled in such a way that the establishment of a pressure differential between two spaces which must be sealed from each other actually assists and enhances its sealing action.

An additional object of the invention is to provide a sealing device which is simple and relatively inexpensive, which can be installed at a low cost in existing apparatus or the like as a superior substitute for conventional sealing devices, and which can furnish a satisfactory and reproducible sealing action irrespective of the pressure differential between the spaces which are to be sealed from each other.

The invention is embodied in a device for sealing a gap of finite length or a circumferentially complete gap between a first space and a second space (e.g., the interelectrode clearance of an ionography imaging chamber) wherein the pressure exceeds, at least at times, the pressure in the first space (such first space may be the air-filled space surrounding the housing of the ionography imaging chamber). The improved sealing device comprises first and second members which respectively have first and second surfaces disposed at the opposite sides of and flanking the gap (one of the members may constitute a portion of the housing of an ionography imaging chamber and the other member may constitute another portion of such housing or a receptor sheet of dielectric material which is introduced into the interelectrode clearance to be exposed to object-modulated X-rays). One of the members has a recess or groove which extends transversely of the gap and receives a seal including a deformable first section having a first side facing the gap and a second side located opposite the first side, a second section which is movably installed between the first section and the other member and has first and second portions (which may constitute the marginal portions of an elongated flap-shaped second section) respectively disposed nearer to the first and second spaces, and means for securing the second section to the one member (preferably by way of the first section) in such a way that at least the second portion of the second section is movable toward and away from the surface of the other member. Still further, the sealing device comprises a source of pressurized fluid (such fluid is preferably a gas) and means (such as a conduit and a valve in the conduit) for admitting fluid from the source against the second side of the first section of the seal so that the first section is deformed and moves the second section (or at least the second portion of the second section) into sealing engagement with the surface of the other member.

The first section of the seal may constitute a hose or a diaphragm and is preferably secured to the one member in such a way that the fluid which is admitted against its second side cannot leak into the gap.

In accordance with another feature of the invention, the second section of the seal has a side which is or may be exposed to pressure in the second space, at least when the second section sealingly engages the surface of the other member. The fluid which fills the second space (the fluid may be Freon or a noble gas if the second space constitutes the interelectrode clearance of an ionography imaging chamber) then acts against the side of the second section and maintains the latter in sealing engagement with the other member regardless of whether or not the application of fluid pressure against the second side of the first section is reduced or terminated.

The novel features which are considered as characteristic of the invention are set forth in particular in the appended claims. The improved sealing device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
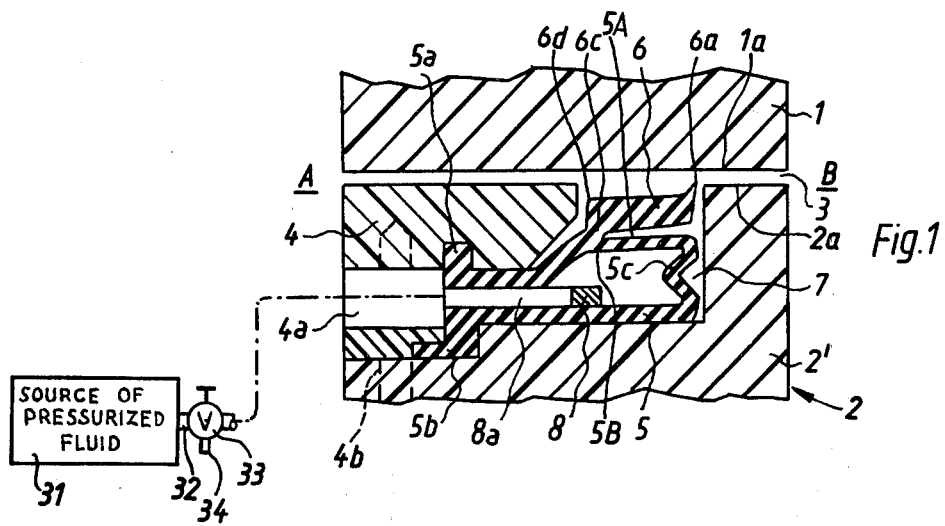
FIG. 1 is a fragmentary schematic partly elevational and partly sectional view of a sealing device which embodies one form of the invention, the seal being shown in the inoperative position.

Referring first to FIG. 1, there is shown a sealing device which serves to prevent, when necessary, the flow of a gaseous or liquid medium between a low-pressure space A and a high-pressure space B. For example, the space B may constitute the interelectrode clearance of an ionography imaging chamber of the type disclosed in the commonly owned U.S. Pat. No. 4,021,668 granted May 3, 1977 to Josef Pfeifer et al. The gap 3 between the spaces A and B is defined by the surfaces 1a and 2a of two members 1 and 2 which may constitute portions of the housing of an ionography imaging chamber. The surface 2a of the member 2 is formed with a recess 7 which extends transversely of the gap (e.g., at right angles to the direction of flow of a fluid between the spaces A and B) and receives a novel and improved seal having a substantially tubular first section or hose 5 and a second section 6 which can be said to constitute a flap and whose thickness (and stiffness) preferably exceeds the wall thickness of the section 5. The tubular section 5 is deformable (it may consist of rubber or other suitable elastomeric material) and has a longitudinally extending slit receiving a relatively thin plate-like insert 8 (the insert 8, which may consist of sheet metal, is assumed to extend at right angles to the plane of FIG. 1, the same as the seal 5, 6). The slit in the section 5 is flanked by two elongated beaded parallel marginal portions 5a, 5b which are received in complementary grooves of the member 2. The latter comprises a first or main portion 2' and a second portion 4 which is detachable from the portion 2' and is secured thereto by bolts, nuts or analogous fasteners (one shown by broken lines, as at 4b). These fasteners constitute a means for maintaining the marginal portions 5a, 5b of the section 5 in sealing engagement with the member 2. That portion of the section 5 which is remote from the marginal portions 5a, 5b is formed with a fold or ply 5c which bulges inwardly, i.e., into the interior of the section 5. The reference character 5A denotes the outer side of the section 5, i.e., that side which faces the gap 3 and the flap 6. The other side or internal surface of the section 5 is denoted by the reference character 5B; this side is located opposite the side 5A.

The seal in the recess 7 further comprises a web 6c which constitutes a means for movably securing the flap 6 to the member 2 by way of the section 5. The web 6c allows the flap 6 to pivot relative to the section 5 and member 2 in such a way that at least the marginal portion 6a (which is remote from the space A and may constitute a relatively sharp ridge) is movable toward and away from the surface 1a of the member 1. The other marginal portion 6d of the flap 6 may but need not reach the surface 1a; this marginal portion is nearer to the space A.

The sealing device further comprises a suitable source 31 of pressurized fluid (such fluid is preferably but need not be a gas) and means for admitting pressurized fluid against the inner side or surface 5A of the section 5. The fluid admitting means comprises a rigid or flexible conduit 32 which contains a suitable valve 33 and can admit fluid into or evacuate fluid from the interior of the section 5 by way of one or more channels or passages 8a in the insert 8. The channels 8a receive fluid from or admit fluid into a bore 4a in the portion 4 of the member 2. The valve 33 has an outlet 34 which communicates with the bore 4a when the operator desires to reduce the pressure of fluid in the section 5a. This valve is preferably of the type which can connect the interior of the section 5 with the source 31 or with the outlet 34 and which can also regulate the pressure of fluid in the interior of the section 5.

The operation is as follows:

When the gap 3 is to be sealed, the valve 33 is actuated to admit pressurized fluid into the section 5 by way of the conduit 32, bore 4a and channel or channels 8a. The seal including the sections 5 and 6 normally assumes the collapsed position of FIG. 1, i.e., the marginal portion or ridge 6a of its flap 6 is normally out of contact with the surface 1a so that a dielectric receptor sheet or the like can be moved through the gap 3 from the space A into the space B or vice versa without contacting the flap or without being forced into strong frictional engagement with the flap.

Figure 2:
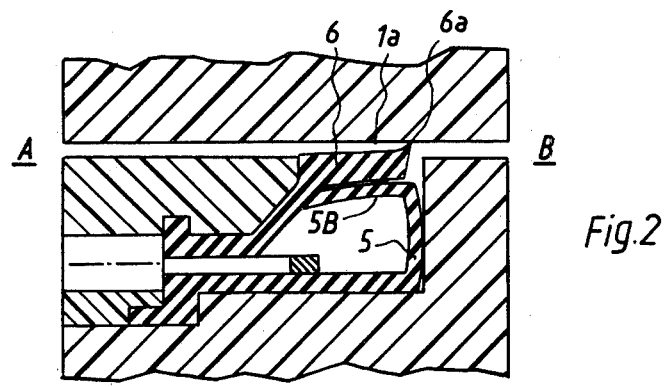
FIG. 2 shows the right-hand portion of the sealing device of FIG. 1, with the seal in operative position and with the second side of the first section of the seal subjected to the action of a pressurized fluid.

Once the section 5 expands in response to admission of pressurized fluid, its outer side 5A and/or the web 6c causes the flap 6 to move the marginal portion 6a into sealing engagement with the surface 1a. This is shown in FIG. 2. At the same time, the fold or ply 5c disappears or becomes less pronounced. The underside 6b of the flap 6 may but need not be exposed when the section 5 is inflated while the pressure in the space B equals the pressure in the space A. The space B can receive pressurized fluid as soon as the marginal portion 6a engages the member 1.

If the pressure of fluid in the section 5 is thereupon reduced or terminated (see FIG. 3), the section 5 collapses, either entirely or in part, but the marginal portion 6a of the flap 6 continues to bear against the surface 1a as long as the pressure in the space B exceeds the pressure in the space A because the pressure in the space B acts against the side 6b of the flap 6. Once the pressure in the space B is reduced to equal or match that in the space A, the entire seal reassumes the position shown in FIG. 1 and the gap 3 is free, i.e., a sheet can be moved from the space A into the space B or vice versa. It is clear that the pressure in the space B may equal atmospheric pressure if the pressure in the space A is reduced below atmospheric pressure; the sealing action of the flap 6 is not affected by the manner in which a pressure differential is established and/or maintained at the opposite sides of the marginal portion 6a. When the flap 6 reassumes the position of FIG. 1, the gap can transmit light and/or allow for passage of fluid between the spaces A and B.

Figure 3:
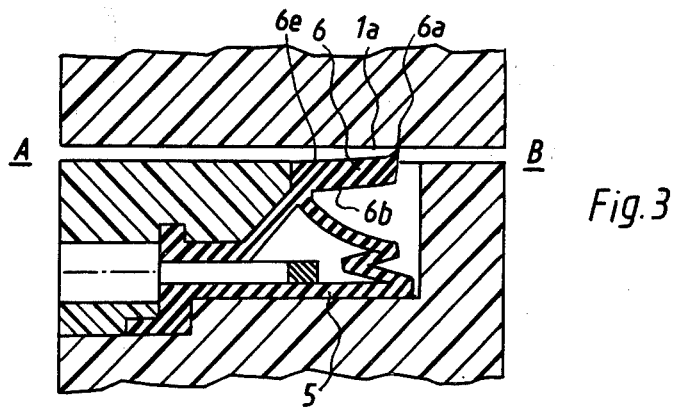
FIG. 3 shows the structure of FIG. 2, with the seal in operative position but with the pressure of fluid against the second side of the first section of the seal reduced or terminated.

The reduction of pressure in the interior of the section 5 subsequent to establishment of a pressure differential between the spaces A and B is optional. However, such reduction of pressure is often advantageous or desirable, for example, when the pressure in the space B exceeds the pressure in the space A for a relatively long interval of time. As the pressure in the interior of the section 5 decreases, the pressure of fluid filling the space B and the gap portion to the right of the marginal portion 6a causes the section 5 to collapse (see FIG. 3) and the pressurized fluid acts against the underside 6b of the flap 6 to urge at least the marginal portion 6a against the surface 1a. FIGS. 2 and 3 further show that the configuration of the portion 4 of the member 2 can be such that the left-hand marginal portion 6d of the flap 6 is unable to reach the surface 1a irrespective of the extent of fluid pressure in the section 5 and/or at the underside 6b of the flap 6. However, and especially if the pressure of fluid in the section 5 or at the underside 6b is relatively high, the flap 6 may be deformed to such an extent that a median portion of its upper side 6e also engages the surface 1a. The provision of a marginal portion 6a which constitutes a ridge (a configuration which renders it possible to maintain the portion 6a in what can be called linear contact with the surface 1a) is often desirable and advantageous because the introduction of pressurized fluid into the section 5 and/or the admission of pressurized fluid against the underside 6b insures that the marginal portion 6a bears against the member 1 with a substantial force to thus guarantee a highly reliable sealing action of the flap between the spaces A and B.

The section 5 will be caused to collapse (while the marginal portion 6a continues to sealingly engage the member 1) if the interior of the section 31 remains connected to the source 5 of pressurized fluid but the pressure of fluid in the right-hand portion of the gap 3 rises to a value at which the fluid filling the space B can deform the section 5 against the opposition of fluid which applies pressure against the inner side 5B. It will be seen that the improved sealing device operates properly if the pressure in the section 5 is reduced to atmospheric pressure or is only slightly less than the pressure in the space B, as long as the deformation of section 5 in response to admission of pressurized fluid into the section 5 results in movement of the marginal portion 6a against the surface 1a prior to appreciable increase of fluid pressure in the space B. As mentioned above, the marginal portion 6a is automatically disengaged from the surface 1a when the valve 33 is set to connect the bore 4a with the outlet 34 and the pressure in the space B drops sufficiently to allow the flap 6 to return to the inoperative position of FIG. 1.

An important advantage of the improved sealing device is that its flap 6 can be moved to and from sealing engagement with the surface 1a by the simple expedient of admitting pressurized fluid into and evacuating fluid from the interior of the section 5.

Another advantage of the sealing device is that the flap 6 remains in sealing position when the pressure of fluid in the space B exceeds the pressure in the space A, even if the pressure in the section 5 is less than the pressure in the space B and/or if the fluid is allowed to escape from the section 5. This insures that the spaces A and B are properly sealed from each other in the event of failure of the fluid admitting system for the section 5 as long as the pressure in B exceeds the pressure in A.

A further advantage of the sealing device is that the flap 6 is mounted and configured in such a way that, as a rule, only its marginal portion 6a engages with the member 1. Since the area of contact between the marginal portion 6a and the surface 1a is relatively small, the sealing action is very pronounced and highly reliable.

An additional advantage of the sealing device is that the seal 5, 6 can readily compensate for variations in the width of the gap 3, i.e., the marginal portion 6a of the preferably deformable flap 6 will move into sealing engagement with the surface 1a even if the width of the gap 3 varies within a wide range, as considered at right angles to the plane of FIG. 1, 2 or 3.

The sections 5 and 6 of the seal in the recess 7 of the member 2 may constitute two discrete parts. In such sealing devices, the web 6c is omitted or forms part of the flap 6 and is secured directly to one or more portions of the member 2, i.e., of that member which is formed with the recess 7. However, a one-piece seal is preferred at this time because of lower manufacturing cost and simplicity of installation in the member 2.

An advantage of the fold 5c is that it allows for substantial changes in the volume of the section 5 without pronounced stretching of the elastomeric material. This contributes to longer useful life of the section 5. In fact, the provision of one or more folds (i.e., of a substantially bellows-shaped inflatable section) renders it possible to make the section 5 of a flexible material whose elasticity is limited or which is not elastic at all.

Figure 4:
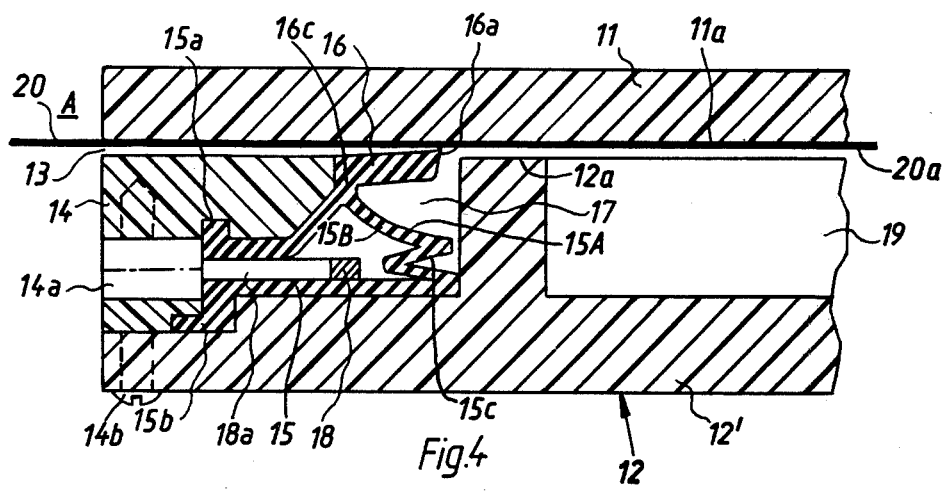
FIG. 4 is a fragmentary sectional view of an ionography imaging chamber which embodies a modified sealing device.
Figure 5:
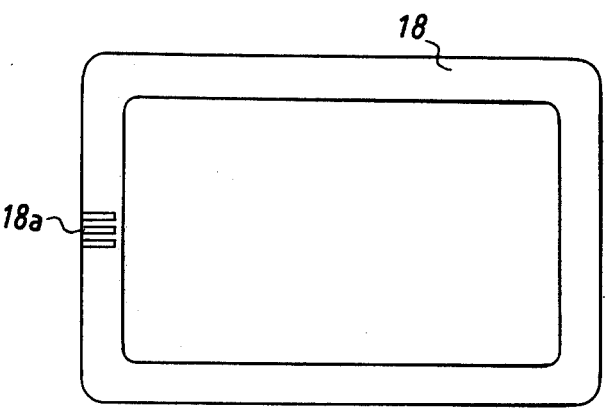
FIG. 5 is a plan view of an insert which forms part of the sealing device of FIG. 4.

FIG. 4 shows a modified sealing device wherein the members 11 and 12 constitute two portions of the housing of an ionography imaging chamber. The space 19 corresponds to the space B shown in FIGS. 1—3 and the space A around the housing communicates with the atmosphere. The gap between the surfaces 11a, 12a of the members 11, 12 is shown at 13, and this gap receives a portion of a sheet-like member 20 assumed to constitute a dielectric receptor for latent images which develop when the sheet portion in the space 19 (this is the interelectrode clearance of the ionography imaging chamber) is exposed to object-modulated X-rays in the manner as disclosed, for example, in the aforementioned U.S. Pat. No. 4,021,668. It will be noted that the space A of FIG. 4 surrounds the space or clearance 19 and, therefore, the improved seal in the recess 17 of the surface 12a preferably surrounds the entire space 19. The width of the gap 13 (as considered at right angles to the plane of FIG. 4, must be sufficient to allow for convenient shifting of the member 20 into and from the space 19. That surface of the member 20 which faces the surface 12a of the member 12 is shown at 20a; when the sealing device of FIG. 4 is operative, the marginal portion 16a of the section or flap 16 of the seal in the recess 17 sealingly engages the surface 20a except when the entire sheet 20 is moved to the right of the marginal portion 16a at a time when the section 15 of the seal in the recess 17 is inflated. The member 11 may constitute a cover which is detachably secured to the member 12. The latter comprises a main portion 12' and a frame-like second portion 14 having a bore 14a (corresponding to the bore 4a of FIG. 1) and recesses for complementary beaded marginal portions 15a, 15b of the section 15. The marginal portions 15a, 15b are maintained in sealing engagement with the member 12 by fasteners 14b which secure the portion 14 to the portion 12'. The insert 18 is a circumferentially complete annulus (see FIG. 5) which has one or more channels or passages 18a in register with the bore 14a in the portion 14. The source of pressurized fluid and the means for admitting pressurized fluid into the bore 14a are not shown in FIG. 4. When the admitted pressurized fluid applies pressure against the inner side or surface 15B of the section 15, the outer side 15A of the section 15 and/or the web 16c moves the marginal portion 16a of the flap 16 into sealing engagement with the surface 20a of the sheet-like member 20, and the marginal portion 16a thereupon remains in sealing engagement with the surface 20a even if the fluid is evacuated from the interior of the section 15 or the pressure in the space 19 rises to such an extent that it causes the section 15 to collapse. The fold of the section 15 is shown at 15c. The section 15 can be said to constitute a circumferentially complete annular conduit or hose which is deformable (expandible) in response to admission of pressurized fluid into its interior and which is also deformable (collapsible) when the pressure in the space 19 rises sufficiently to exceed the pressure in the interior of the section 15.

FIG. 4 shows the one-piece seal 15, 16 in the recess 17 in the inoperative position. Thus, the marginal portion 16a of the flap 16 may but need not bear against the surface 20a of the member 20 and the latter can be readily moved in the gap 13 toward or away from the space 19. Once the sheet-like member 20 is properly inserted, the section 15 is inflated by a gaseous or liquid fluid and the marginal portion 16a sealingly engages the surface 20a. The pressure of fluid (e.g., Freon or a noble gas, such as Krypton or Xenon) in the space 19 is thereupon increased (e.g., to 6-20 atmospheres superatmospheric pressure) and the sheet portion in the space 19 is ready for exposure to object-modulated X-rays. When the pressure in the space 19 is reduced to match the pressure in the space A, and the pressure in the interior of the section 15 does not exceed the pressure in the spaces A and 19, the seal in the recess 17 reassumes its normal position in which the pressure with which the marginal portion 16a bears against the surface 20a is sufficiently low (or is reduced to zero) to permit for shifting of the member 20 in a direction away from the space 19.

An advantage of the sealing device of FIG. 4 is that it allows for repeated introduction and withdrawal of one and the same sheet-like member 20 or of successive sheet-like members without necessitating even partial detachment of the member 11 from the member 12. Moreover, the likelihood of escape of valuable gas from the space 19 and/or of undesirable mixing of such gas with substantial quantities of air is very remote. It has been found that the interval which is required for introduction or withdrawal of a sheet-like member 20 into or out of the space 19 is a small fraction of interval which is needed in ionography imaging chambers having conventional sealing devices. When the section 15 is inflated, the marginal portion 16a of the circumferentially complete flap 16 lies against and sealingly engages all four sides of the normally square or rectangular sheet-like member 20, i.e., the flap 16 establishes an effective seal around the entire space 19 and all the way around that portion of the surface 20a which is about to be exposed to object-modulated X-rays. The provision of a circumferentially complete seal exhibits an important advantage over a seal of finite length because the sealing action at both ends of a seal of finite length is likely to be at least slightly less satisfactory than between such ends.

Figure 6:
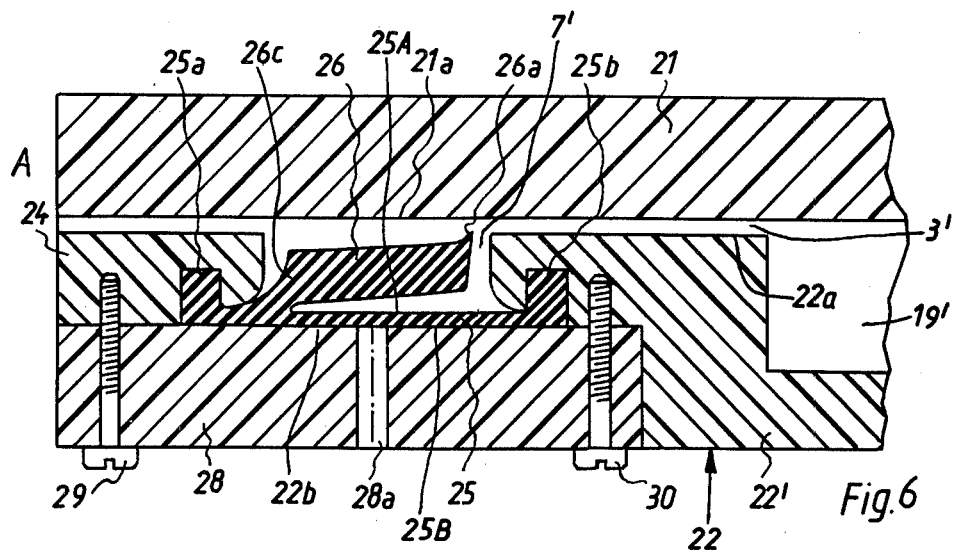
FIG. 6 is a fragmentary sectional view of a sealing device which constitutes a first modification of the device shown in FIG. 5.

FIG. 6 illustrates a third sealing device wherein the section 25 of the seal in the recess 7' of the surface 22a of the member 22 is a diaphragm and the sealing device further comprises means including bolts 29, 30 or analogous fasteners which maintain the beaded marginal portions 25a, 25b of the diaphragm 25 in sealing engagement with the member 22. The latter comprises a main body portion 22' and two additional portions 24, 28. The fasteners 29 secure the portion 24 to the portion 28 and clamp the marginal portion 25a between the portions 24, 28. The fasteners 30 secure the portion 28 to the main portion 22' and clamp the marginal portion 25b between the portions 22' and 28. The flap is shown at 26, and its ridge-like marginal portion is shown at 26a. The gap 3' connects the space 19' with the space A and its upper side is flanked by the surface 21a of a second member 21 which may constitute the cover or lid of the housing of an ionography imaging chamber.

The means for admitting a pressurized fluid which bears against the side 25B of the diaphragm 25 includes a bore 28a in the portion 28 of the member 22. The diaphragm 25 is then deformed and its side 25A and/or the web 26c causes the marginal portion 26a of the flap 26 to bear against the surface 21a or against the surface of a sheet-like member in the gap 3'. The reference character 22b denotes a surface which bounds the deepmost region of the recess 7' and against which the side 25B abuts when the diaphragm 25 is not deformed.

Figure 7:
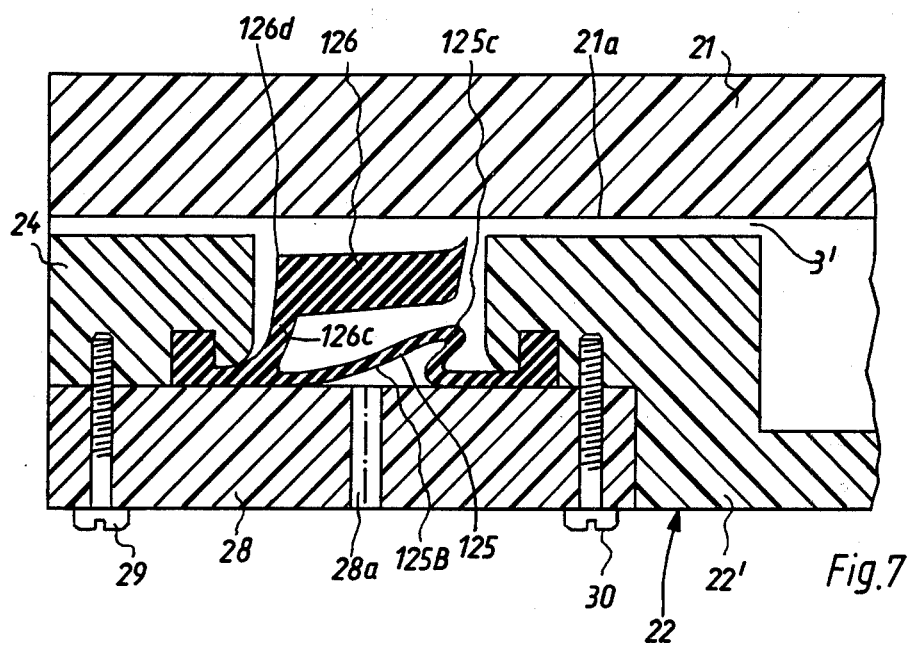
FIG. 7 is a similar fragmentary sectional view of a sealing device which constitutes a second modification of the sealing device shown in FIG. 4.

The sealing device of FIG. 7 is practically identical with the device of FIG. 6. The only difference is that the diaphragm 125 has a fold 125c so that the diaphragm 125 is flexed but need not be overly expanded when its side 125B is subjected to the pressure of a fluid which is admitted via bore 28a in the portion 28 of the member 22. The position of the web 26c or 126c between the sections 25, 26 or 125, 126 of FIGS. 6 and 7 is such that the left-hand marginal portion 26d or 126d of the section or flap 26 or 126 is unlikely to contact the surface 21a when the diaphragm or section 25 or 125 is deformed in response to admission of pressurized fluid via bore 28a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A device for sealing a gap between a first space and a second space wherein the pressure exceeds, at least at times, the pressure in said first space, comprising first and second members respectively having first and second surfaces disposed at the opposite sides of and flanking said gap, the surfaces of one of said members having a recess extending substantially transversely of said gap; a seal mounted in said recess and including a deformable first section having a first side facing said gap and a second side located opposite said first side, a second section movably installed between said first section and the other of said members and having first and second portions respectively disposed nearer to said first and second spaces, and means for securing said second section to said one member so as to enable at least said second portion to move toward and away from said other member; a source of pressurized fluid; and means for admitting fluid from said source against said second side of said first section to thereby move said first side toward said gap and to thus effect the movement of at least said second portion of said second section into sealing engagement with the surface of said other member, said second section having a side facing away from said gap and being exposed to pressure in said second space in response to admission of pressurized fluid against said second side of said first section so that the pressure which is applied against said side of said second section maintains said second portion of said second section in sealing engagement with the surface of said other member as long as the pressure in said second space exceeds the pressure in said first space and regardless of whether or not pressurized fluid is evacuated from said second side of said first section subsequent to movement of said second section into sealing engagement with said other member.

2. A device as defined in claim 1, wherein said first section of said seal has spaced-apart first and second marginal portions extending transversely of said gap, and further comprising means for maintaining at least one of said marginal portions in sealing engagement with said one member.

3. A device as defined in claim 1, wherein said securing means comprises a web which is integral with said first section and with said first portion of said second section.

4. A device as defined in claim 1, wherein said first section is a hose.

5. A device as defined in claim 1, wherein said first section is a diaphragm.

6. A device as defined in claim 5, wherein said one member has an additional surface remote from said gap and bounding a portion of said recess, said diaphragm having first and second marginal portions extending transversely of said gap and further comprising means for maintaining said marginal portions in sealing engagement with said additional surface.

7. A device as defined in claim 1, wherein said first section has a deformable fold extending transversely of said gap, said fold being more pronounced when the pressure against said second side does not appreciably exceed the pressure against said first side and vice versa.

8. A device as defined in claim 7, wherein said fold has a bulge at said second side of said first section.

9. A device as defined in claim 1, wherein one of said spaces surrounds the other of said spaces and said sections of said seal constitute circumferentially complete annuli between said spaces, said other member constituting a sheet which is movable between said spaces by way of said gap.

10. A device as defined in claim 9, further comprising a housing including said one member and an additional member having a portion disposed behind the sheet in said gap, said housing defining said other space.

11. A device as defined in claim 10, wherein said first section comprises a pair of spaced-apart circumferentially complete marginal portions, and further comprising means for maintaining said marginal portions in sealing engagement with said one member.

12. A device as defined in claim 11, wherein said one member comprises several separable portions and said marginal portions are disposed between said separable portions, said means for maintaining said marginal portions of said first section in sealing engagement with said one member comprising fastener means which secures said separable portions of said one member to each other.

13. A device as defined in claim 11, further comprising an annular insert disposed between said marginal portions and having at least one passage for admission of pressurized fluid against said second side of said first section or for evacuation of such fluid.

14. A device as defined in claim 1, wherein said source contains a gaseous fluid.

15. A device as defined in claim 1, wherein said seal consists of a single piece of elastomeric material.

16. A device for sealing a gap between a first space and a second space wherein the pressure exceeds, at least at times, the pressure in said first space, comprising first and second members respectively having first and second surfaces disposed at the opposite sides of and flanking said gap, the surface of one of said members having a recess extending substantially transversely of said gap; a seal consisting of a single piece of elastomeric material and mounted in said recess, said seal including a deformable first section having a first side facing said gap and a second side located opposite said first side, a second section constituting a flap and movably installed between said first section and the other of said members and having first and second portions respectively disposed nearer to said first and second spaces, and means for securing said second section to said one member so as to enable at least said second portion to move toward and away from said other member, said securing means constituting a hinge between said sections; a source of pressurized fluid; means for admitting fluid from said source against said second side of said first section to thereby move said first side toward said gap and to thus effect the movement of at least said second portion of said second section into sealing engagement with the surface of said other member; and means for sealing said second side of said first section from said gap so that pressurized fluid which is admitted against said second side cannot leak into said gap.

* * * * *